May 30, 1961 W. F. WALKER 2,986,729
DRIFTMETERS
Filed Aug. 26, 1957 3 Sheets-Sheet 1

INVENTOR.
WATSON F. WALKER
BY
ATTORNEY

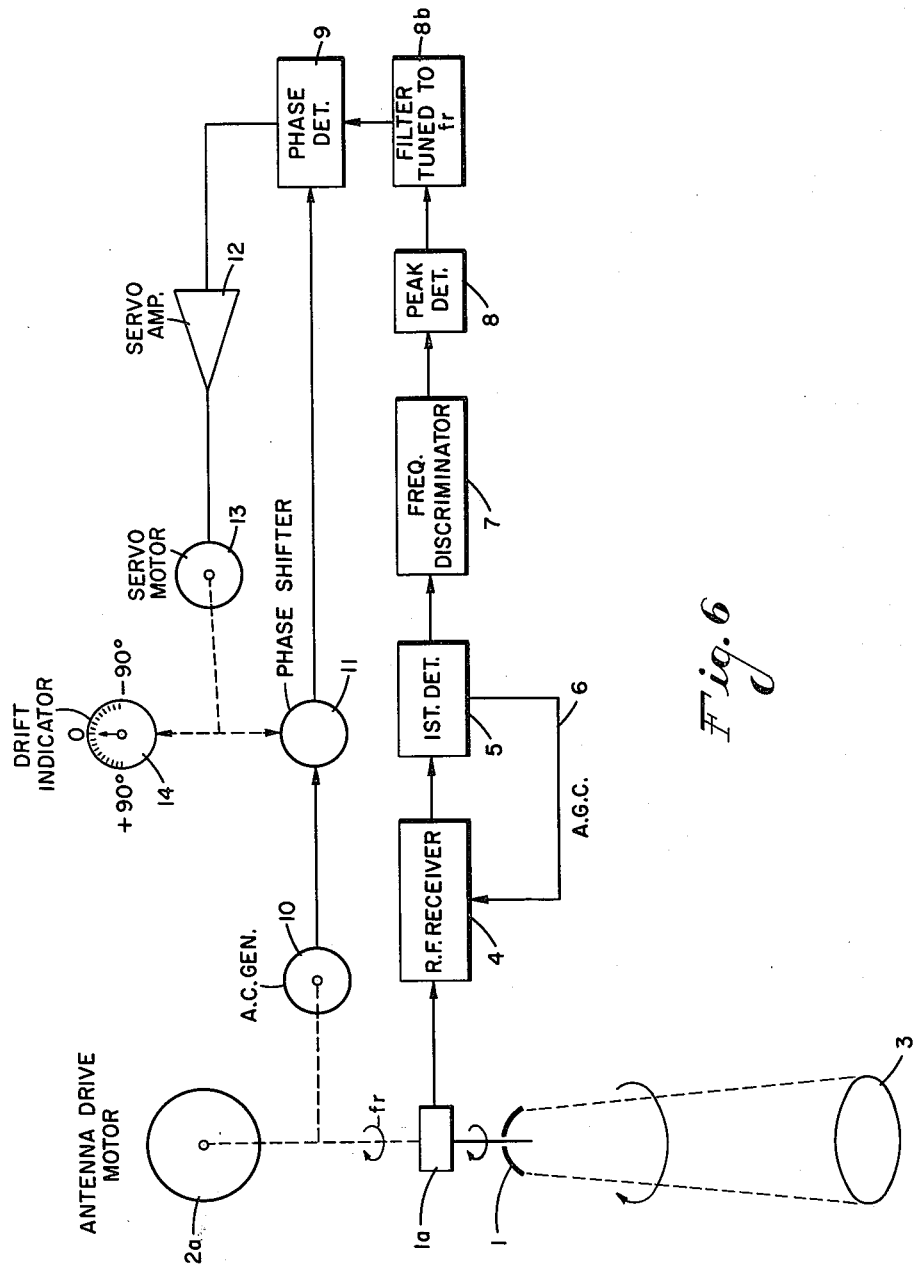

United States Patent Office 2,986,729
Patented May 30, 1961

2,986,729
DRIFTMETERS
Watson F. Walker, Rochester, N.Y., assignor to General Dynamics Corporation, Rochester, N.Y., a corporation of Delaware
Filed Aug. 26, 1957, Ser. No. 680,314
9 Claims. (Cl. 343—7)

This invention relates to driftmeters, particularly for airplanes.

The object of this invention is to provide an improved method and equipment for measuring drift.

A more specific object of this invention is to provide an improved driftmeter and method which will continuously and reliably indicate the lateral motion of a figure such as an airplane relative to its forward heading or ground track.

The objects of this invention are attained by the passive use of infrared or visible light radiations from the ground, or by illuminating the ground beneath the airplane with radiant energy, such as continuous radio waves, and receiving the reflected energy with a directional antenna having an irregular ground pattern so that the airplane receiver "sees" reflected objects moving across an aperture of relatively small size and which typically may be elliptical in shape. The duration of the pulse type signals derived from reflecting objects moving across the aperture becomes a function of the orientation of the major and minor axes of the aperture with respect to the ground track. Since the orientation of the axis with respect to the air frame is known, the drift angle can be computed.

Figure 1:
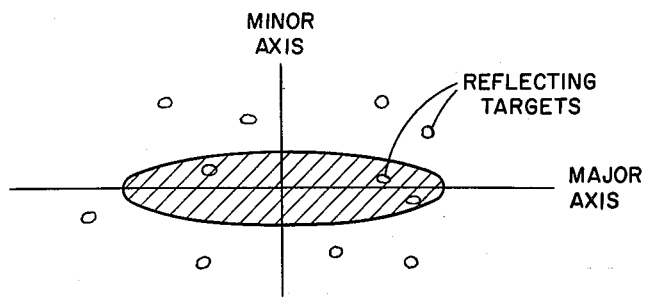
Figure 2A:
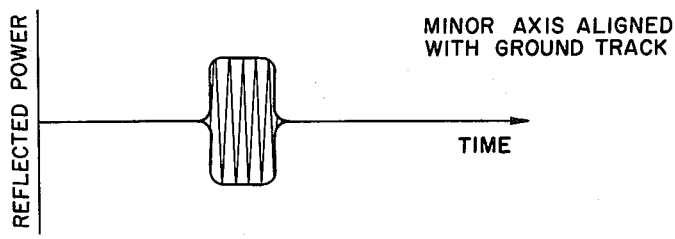
Figure 2B:
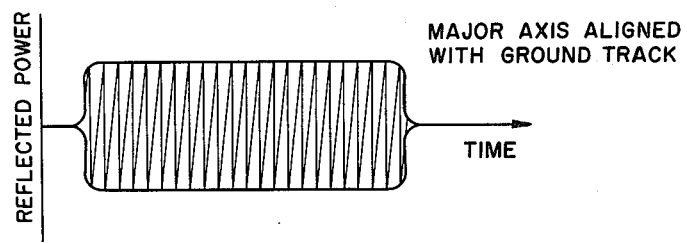
Figure 3:
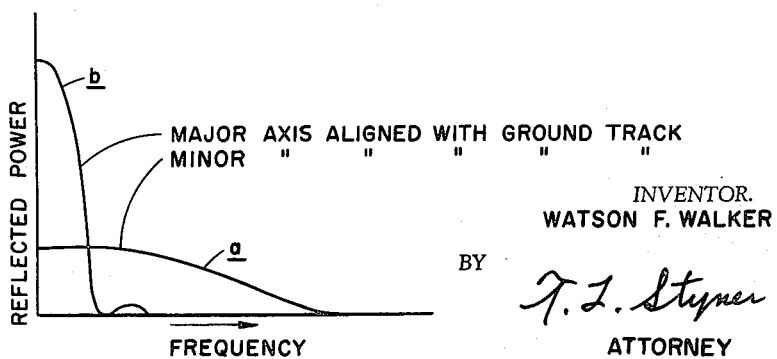
Figure 4:
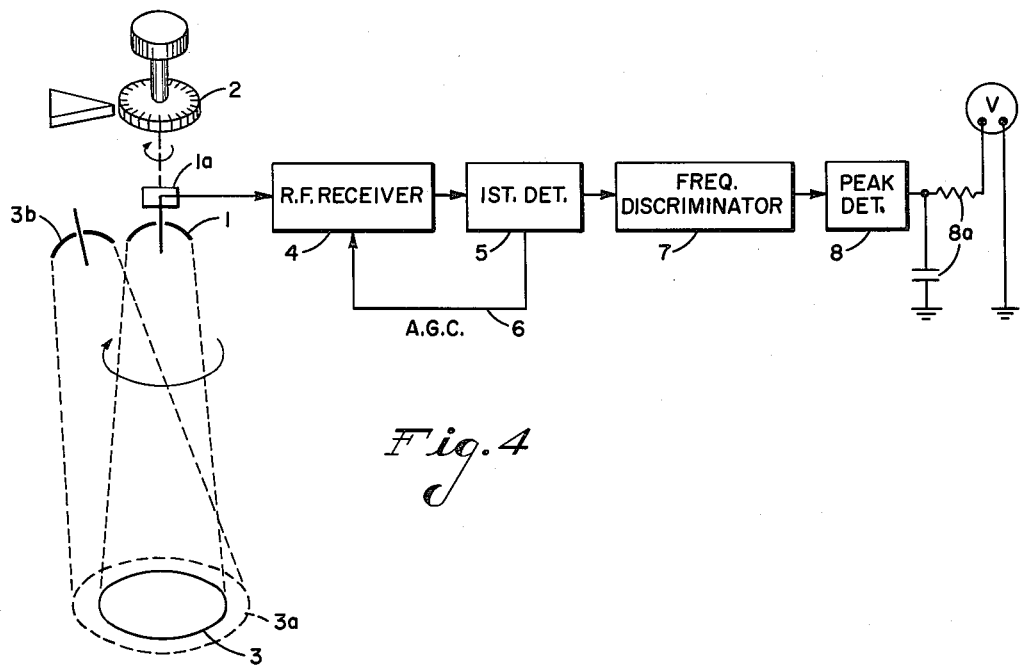
Figure 5:
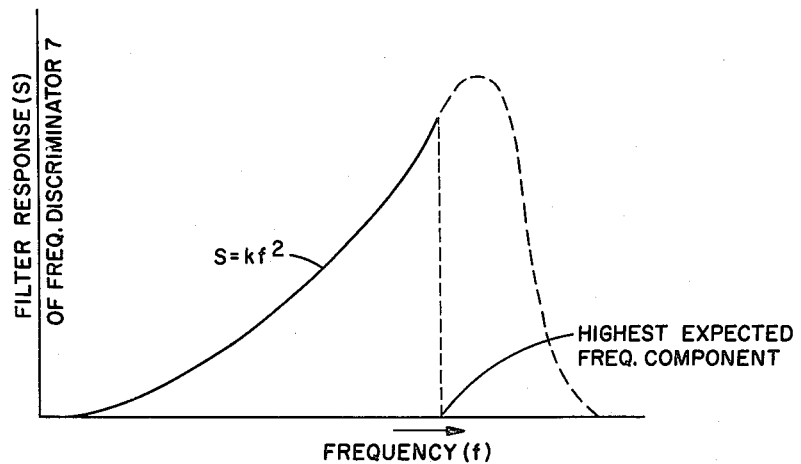

Other objects and features of this invention will become apparent to those skilled in the art by referring to the following specifications and accompanying drawing in which:

Figure 1 shows a cross-section of the receiving antenna pattern of this invention, Figures 2a and 2b are pulse diagrams produced by radiant or reflective objects traveling, respectively, along the minor and major axes of the pattern of Figure 1, Figure 3 shows the spectral distribution of the pulses of Figures 2a and 2b, Figure 4 is a block diagram of one driftmeter system of this invention, Figure 5 shows the frequency characteristic of the frequency discriminator of Figure 4, and Figure 6 is a block diagram of another driftmeter of this invention.

The antenna 1 of Figure 4 is presumed to be highly directional and to receive energy only on or near the median axis of the antenna. Reflectors can be constructed so that the received energy is substantially collimated and has a divergence of but a few minutes. Further, such reflectors may be easily designed, the cross-section of the pattern of which may be substantially elliptical. When such a reflector-antenna is aimed toward the ground, it will "see" a fairly well defined elliptical area as represented in Figure 1. If the ground at which the receiving antenna is aimed radiates infrared energy or is illuminated by C.W. radio energy, irregular surfaces and discrete objects on the ground will pass across the aperture of the receiving antenna, producing pulses of energy the duration of which is proportional to the time the reflecting object remains in the aperture.

When such pulse information is amplified, the envelopes will appear as shown in Figures 2a and 2b. When the reflecting object moves along or parallel to the minor axis of the antenna pattern the pulse will be relatively short as shown in Figure 2a. When the reflecting object moves along the major axis of the antenna aperture the pulse will be relatively long as shown in Figure 2b. The envelope of the pulsed high frequency energy can be quite distinctly delineated regardless of the frequency of the illuminating energy. It is contemplated that an illuminating source, such as continuous radio wave transmitter, be mounted on the airplane closely adjacent the receiving antenna and preferably focused upon the ground area viewed by the receiving antenna, or that the normal infrared emanations from ground objects be used to provide the ground to airplane information.

The received energy will have a spectral distribution which will vary appreciably as the angle between the ground track and the major axis is varied as shown in Figure 3. The spectral distribution of the pulse modulation on the received energy will be broadest when the minor axis of the ellipse is aligned with the ground track; and the spectral distribution of the modulation on the received energy will be narrowest when the major axis of the ellipse is aligned with the ground track. That is, the shorter the pulse duration, the greater is the band width, as well known from the Fourier analysis of the pulse.

According to an important feature of this invention, the difference in frequency content of pulses of the major and minor axes is employed to identify the pulses. The orientation of the pulses with respect to the ellipse axis and, hence, with respect to the air frame, may be determined.

In Figure 4, the directive pick-up 1 is physically rotated on a vertical axis so that the oblong pattern 3 rotates on the ground, and within the area 3a if illuminated by the directed radiant energy source 3b. If the energy source is infrared light, the pick-up 1 would be an infrared cell with a suitable optical system. If, however, the source is continuous microwave energy, the pick-up would be a microwave antenna as shown comprising a parabolic reflector with a horn or probe at the focal point of the reflector and with a coaxial cable or waveguide feed. The transmission line has a rotatable coupling 1a, coupling the antenna to the radio frequency receiver, 4, which is adapted to amplify, without appreciable band pass characteristics, the pulse signals received from the ground. The first detector 5 preferably contains a connection for the feedback loop 6 for automatic gain control to the amplifiers of receiver 4. The automatic gain control is fast compared to the rotational speed of the antenna, but is slow compared to the duration of any object passing through the field of view. The detector 5 extracts the envelope information of Figures 2a and 2b, containing the low and the high frequency components of the pulses, and applies such pulses to the frequency discriminating circuit 7. The discriminating circuit 7 may be of many known filter designs, preferably having the characteristics of the type shown in Figure 5 where attenuation changes relatively uniformly and is an exponential function of frequency, such as the square function. One slope of the characteristics is preferably sufficient in extent to span the entire frequency range encountered by the antenna and receiver 1—4. The effect of this filter is to produce at its output greatest energy when input frequency is highest as when the minor axis of the antenna pattern is aligned with the ground track.

The peak detector 8 is used to detect the pulse envelope available in the output of the frequency discriminating filter. By integrating the detected pulses, as by the C.R. circuit 8a, a readable voltage results which is the summation of all the discrete ground pulses. In operation, the hand wheel 2, coupled directly to the antenna reflector, is manipulated to produce either a maximum or minimum needle deflection, indicating alignment of the minor or major axis, respectively, with the ground track. Since the rotational position of the antenna aperture is known with respect to the air frame, the degrees of drift may then be read from the hand wheel.

The manual system of Figure 4 may be extended to the fully automatic system of Figure 6, if desired. The motor 2a is substituted for the handwheel to drive the directional receiving antenna at a constant speed of, say, 1000 revolutions per minute. The pulse signals are amplified at 4, detected at 5, and are differentiated at 7 according to frequency content as before. But, because of the action of the discriminator 7, the output of the peak detector will contain a strong sinusoidal component, $f_r$, at the frequency of rotation of the antenna. This component will reach its positive peak preferably when the minor axis is aligned with the ground track. Preferably, the sinusoidal component is accentuated by the filter 8b, tuned to the component.

In the embodiment of Figure 6, the filtered output of the peak detector 8 is applied to one input of the phase comparator or detector 9, to the other input of which is connected the alternating current generator 10. The antenna drive motor 2 also drives the generator 10 which produces a sinusoidal voltage reaching its positive peak at the time that the minor axis of the ellipse is aligned with the airplane heading. It now becomes a matter of comparing the time phase of the pulses at the output of the peak detector 8 with the sinusoidal wave at the output of generator 10. Such a phase difference can be calibrated in terms of angle of the major or minor axis of the ellipse with the ground track. Measurement of the phase difference may be made in a number of different ways. For example, the pulse and sinusoidal waves may be displayed, stroboscopically, on a cathode ray tube with a well regulated sweep. More accurately, one of the two waves to be compared may be manually shifted to obtain a null voltage when the waves are exactly in or out of phase. Conveniently, the output of the generator 10 is shifted in phase by the phase shifter 11 before the sinusoidal wave is applied to the phase detector 9. When the two input signals to the phase detector 9 agree in phase, the output of the phase detector is zero. If the phase shifter is adjusted so as to shift the phase of the A.C. generator output an amount equal to the drift angle, this zero output condition from the phase detector is realized. Phase zeroing is accomplished automatically in the embodiment of Figure 6 by the servo amplifier 12 in the output of the phase detector and driving the servo motor 13. The motor will run in either direction to drive the phase shifter to produce the phase matching and zeroing at the detector 9. The drift indicator dial 14 is coupled mechanically to the shaft of the phase shifter and is calibrated in terms of degrees of drift angle. The system of Figure 6 will continuously and accurately indicate drift angle without the aid of a human operator.

Many modifications may be made in the system of Figures 4 and 6 without departing from the scope of the invention as defined in the following claims.

What is claimed is:

1. In combination in a driftmeter, a directional radiant energy pick-up with an elliptical aperture aimed substantially vertically, a high frequency receiver coupled to said pick-up, automatic gain control circuits in said receiver, a frequency discriminator connected to said receiver, said discriminator being responsive to the frequency content of the signals amplified by said receiver to produce signals the amplitudes of which are a function of frequency, a peak detector coupled to said discriminator, an indicating circuit connected to said detector, and means for rotating the aperture of said antenna.

2. In combination in a driftmeter, a directional antenna with an approximate elliptical aperture directed substantially vertically downwardly, a motor for rotating said aperture about the median axis of said directional antenna, a high frequency receiver coupled to said antenna, automatic gain control circuits in said receiver, frequency discriminating circuits selectively responsive to the different frequency components of the received signals, a peak detector coupled to said frequency discriminator, an alternating current generator driven in synchronism with said aperture, and means for comparing the phase of the wave of said generator with the phase of the signals at the output of said peak detector.

3. In combination in a driftmeter, a directional antenna with an approximate elliptical aperture, a motor for rotating said aperture, a high frequency receiver coupled to said antenna, automatic gain control circuits in said receiver, frequency discriminating circuits selectively responsive to the different frequency components of the received signals for producing a voltage the amplitude of which is a continuous function of said frequency components, a peak detector coupled to said discriminating circuit, an alternating current generator driven in synchronism with said aperture; a phase detector with two inputs, one input being connected to said peak detector and the other input being connected to said A.C. generator, a phase shifter in one of said input circuits, a servo motor responsive to the output of said phase detector and driving said phase shifter, and a degree phase shift indicator connected to said phase shifter.

4. In combination in an airplane navigating instrument, means for irradiating the ground beneath a moving airplane with electromagnetic energy, antenna means for substantially collimating the energy reflected vertically to the airplane from the ground, said antenna means having an aperture for viewing a limited generally elliptical area of the irradiated ground so that the time of travel of discrete radiating objects on the ground moving across said aperture is a function of the angular position of one axis of said area with respect to the direction of travel of the airplane, said antenna means being rotatable about the median axis of the antenna means, a sensing device responsive to the collimated energy for producing voltage pulses the durations of which are proportional to said time of travel across the aperture, means coupled to the energy sensing device for detecting and amplifying said voltage pulses, a frequency discriminating circuit responsive to the band of frequencies comprising said pulses coupled to the last-mentioned means for producing a voltage the amplitude of which is analogous to the durations of the pulses, and a peak detector coupled to said frequency discriminator circuit for detecting the envelope of said voltage.

5. An airplane navigating instrument comprising means for receiving electromagnetic energy emanated from the terrain beneath the airplane, said means including a focusing and collimating structure for forming an effective aperture for selectively receiving radiant energy within a confined oblong area on said terrain, a detector coupled to said receiving means for isolating the pulse-type signals of different durations produced by discrete radiating objects moving in different directions across said aperture, and a frequency discriminator responsive to substantially the entire spectrum of frequencies of the pulse signals coupled to said detector for producing a voltage analogous to the maximum frequencies of said spectrum and to the durations of said pulse-like signals.

6. A system for measuring amplitude of drift of a vehicle normal to heading comprising means for receiving radiant energy from fixed points on the ground plane, directional antenna means coupled to said radiant energy receiving means and aimed substantially vertically for directionally receiving energy from said fixed points, the receiving pattern of said antenna means being irregular in cross-section so that relative movement of said points through said pattern produces signals of different duration for different directions of relative movement, a frequency discriminator coupled to said radiant energy receiving means, and a peak detector coupled to said frequency discriminator for measuring and comparing said signals of different duration and frequency content.

7. A system for determining two orthogonal velocity components of an airplane over the ground comprising antenna means for directionally receiving signals at the airplane energy from discrete points on the ground, the directional pattern of said antenna means being oblong in cross-section so that the duration of a reflection received is a function of the direction of the relative movement of the point through the pattern, a frequency discriminator and a peak detector coupled to said antenna means for measuring the duration of received signals from said discrete points.

8. A system for determining the drift of an airplane over the ground comprising means for irradiating the ground, an antenna for directionally receiving at the airplane reflected energy from discrete points on the illuminated ground, the antenna aperture being irregular in cross-section for varying the duration of receiver signals according to their direction of drift across the antenna aperture, means for detecting the signals received from the ground, means for integrating said signals, and means for indicating the integrated signals.

9. A system for determining the drift of an airplane comprising means for irradiating the ground, a downwardly directed directional antenna for receiving at the airplane reflected energy from discrete points on the illuminated ground, the directional pattern of said antenna being irregular in cross-section so that the duration of a received reflection signal is a function of the direction of said point through said directional pattern, means for detecting the pulses received, and means for discriminating the pulses according to their frequency content, means for calibrating said frequency content in terms of drift angle, and means for rotating said downwardly directed directional antenna about the median axis of said antenna.

References Cited in the file of this patent

UNITED STATES PATENTS

| | | |
|---|---|---|
| 2,193,361 | Rice | Mar. 12, 1940 |
| 2,223,224 | Newhouse | Nov. 26, 1940 |
| 2,396,112 | Morgan | Mar. 5, 1946 |
| 2,476,032 | Feldman et al. | July 12, 1949 |

FOREIGN PATENTS

| | | |
|---|---|---|
| 577,824 | Great Britain | June 3, 1946 |